C. R. BAKER.
HYDROVEHICLE.
APPLICATION FILED AUG. 5 1918.
1,293,665.
Patented Feb. 11, 1919.
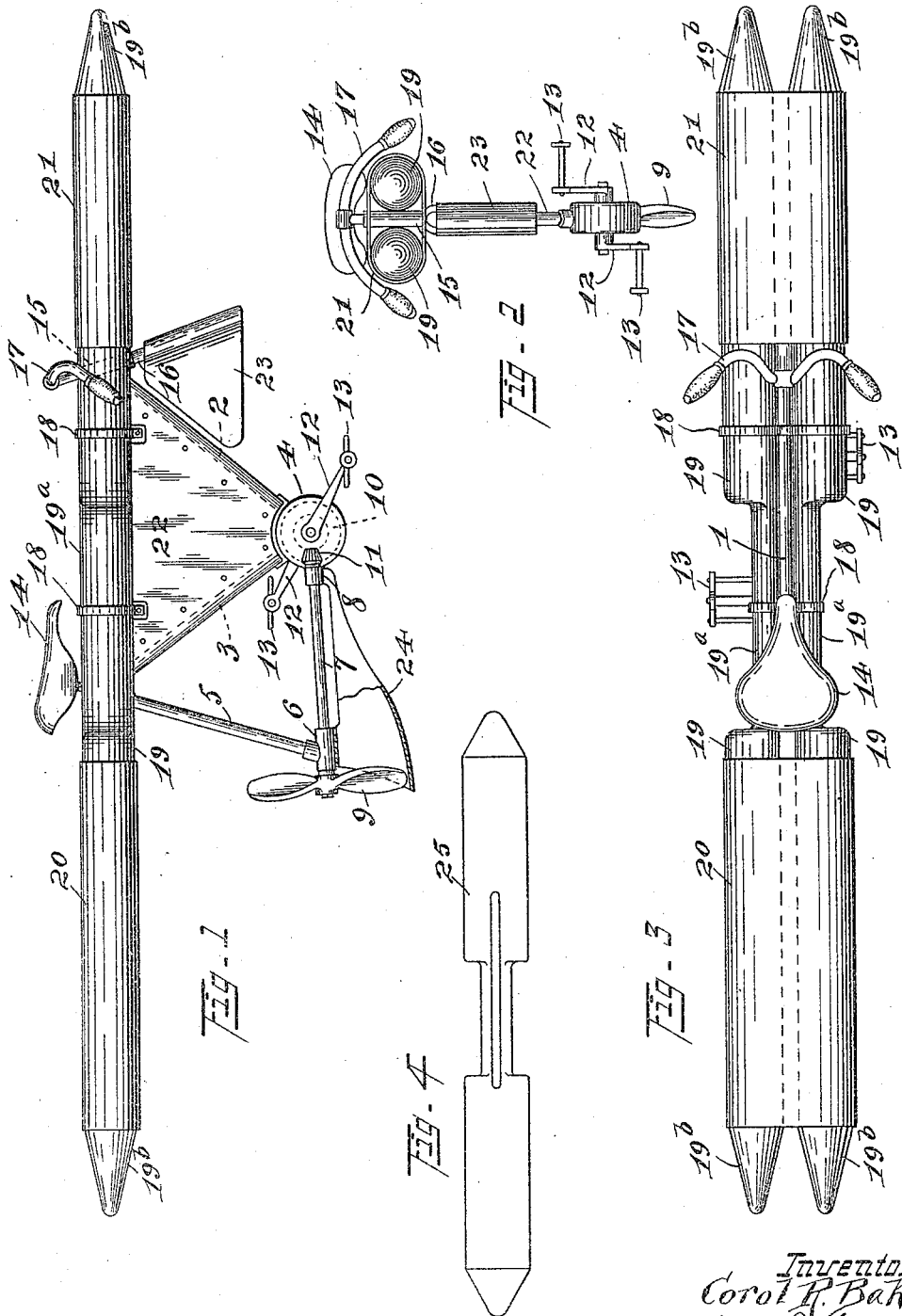
Inventor
Corol R. Baker
By Norris F. Griswold
Atty.

UNITED STATES PATENT OFFICE.

COROL R. BAKER, OF KNOXVILLE, TENNESSEE.

HYDROVEHICLE.

1,293,665.

Specification of Letters Patent.

Patented Feb. 11, 1919.

Application filed August 5, 1918. Serial No. 248,373.

*To all whom it may concern:*

Be it known that I, COROL R. BAKER, a citizen of the United States, residing at Knoxville, in the county of Knox and State of Tennessee, formerly of Akron, Summit county, Ohio, have invented certain new and useful Improvements in Hydrovehicles, of which the following is a specification.

This invention relates to vehicles of the water velocipede type adapted particularly for use in water-sports, and it has for its objects, the provision of a vehicle of this character capable of sustaining itself in operative position in the water, and being easily propelled by foot-power, provision being made for guiding the vehicle whereby it may be abruptly turned or caused to revolve in an area substantially within the longitudinal dimensions of the vehicle. Another object is to provide a simple, durable and economical construction that is capable of carrying out the desired functions. Other objects and advantages will be apparent, and the construction and novel features of the invention will be fully described hereinafter, and defined in the appended claims, in connection with the accompanying drawings, which form a part of the specification, and in which similar reference characters are employed to designate corresponding parts.

In the drawings Figure 1 is a side elevation of the improved machine. Fig. 2 is a front elevation; and Fig. 3 is a plan view. Fig. 4 is an outline plan of a modified float member.

In carrying out the present invention, in the embodiment as shown, a frame is employed, said frame being similar to an ordinary bicycle tubular frame, which includes a triangular construction made up of a horizontal top bar 1 and depending bars 2 and 3, a gear case 4 being supported by said frame at the apex of the angle formed by members 2 and 3. A depending frame member 5 having a journal box 6 at its lower terminal provides a rear support for a propeller shaft 7, said shaft having a bearing in the member 6 and in a journal 8 on the gear case 4. The shaft 7 carries a propeller 9, and is driven by a bevel gear 10 in mesh with a pinion 11 on the shaft 7. The gear 10 is operated by foot power through the medium of cranks 12 provided with pedals 13. A saddle 14 is attached to the frame, and a head member 15 provides a bearing for a steering fork 16 having a handle-bar 17 attached thereto.

The description thus far is applicable to the construction of an ordinary chainless bicycle with the wheels eliminated, and the propeller member 9 attached. This construction forms a suitable economical frame for the vehicle.

Rigidly attached to the frame member 1, by any suitable means, as for example, bands 18, are tubular floats or pontoons 19. These floats are counterparts and are located on opposite sides of the frame, extending longitudinally parallel, and impart buoyancy to the vehicle. While the twin floats 19 are considered preferable, a unitary float structure similar to 25, Fig. 4, may be used, and it will be understood that said unitary float is the equivalent of the combined pontoons 19.

The ends of the floats are preferably of conical formation, as shown at $19^b$, to lessen the resistance of the water, or provide against the retardation of the vehicle in its progress.

For convenience in operating, it is preferable to contract the lateral dimensions of the floats for a predetermined longitudinal distance under the saddle, as shown at $19^a$, thereby providing leg clearance for the operator. It is also desirable for obvious reasons of stability to incase the twin floats with thin sheet members 20 and 21.

An important feature of the present invention is the covering or incasing of the triangle portion of the frame, and in the embodiment as illustrated, a sheet metal member 22 is employed for this purpose. The member 22 is fitted, or turned over and around the frame members 2 and 3, being riveted or otherwise made fast. The upper edge of member 22 may be flush with the under line of frame member 1 or it may be attached to said frame member in like manner to its attachment to members 2 and 3. This forms a filler for the triangular portion of the frame which depends between the floats 19, and co-acting with said floats performs a similar function to that of a centerboard in a sail-boat, stabilizing or maintaining the upright position of the vehicle in the water.

Another salient factor of the invention is the steering means, which responds quickly, or whereby the vehicle can be abruptly turned. With this feature in view, a rearwardly disposed vane or rudder member 23 is rigidly attached to the steering fork 16 and is oscillated by said fork through the medium of the manually actuated handle-bar 17. Durability and rigidity of the rudder being desirable features, it is preferable to construct the rudder substantially as shown, that is, two members are rigidly attached to the prongs of the fork 16 and are united along their rear edges, however a single rudder blade made of non-flexible plate may be rigidly attached to the steering member and perform the desired guiding function. With a trailing rudder of this construction, the vehicle can be turned abruptly by the operator, or when the hands are removed from the steering bar 17 the vehicle is self-steering in a straight away direction.

A guard or fender 24 is provided to protect the propeller 9 from entanglement with weeds or other extraneous elements that may be encountered below the surface of the water.

All parts of the vehicle should be galvanized, enameled or otherwise treated as a protection against the corrosive action of the water.

An embodiment of the invention substantially as shown, has been reduced to practice, and has proved capable of supporting a rider-operator, and performing satisfactorily the functions set forth.

What I claim and desire to secure by Letters Patent is:

1. A water vehicle comprising a float structure, a frame mounted equilaterally and depending from said float structure, a vertical stabilizing plane or fin rigidly attached to said depending frame, a steering rod having a hand steering member directly attached thereto, depending from the float structure and journaled in the frame forward of the stabilizing plane, a rudder vane attached directly to said steering rod, pedal crank driven coöperating gears mounted on the depending frame, and a longitudinal propeller mounted on the frame and driven by said gears.

2. In a water vehicle, the combination of a float structure; a frame mounted in said float structure and depending equilaterally therefrom, a portion of said frame being covered to form a vertical stabilizing plane or fin; a saddle connected with said frame above the float structure; coöperating bevel gears mounted on the said depending frame; a propeller mounted on said frame, adapted to be driven by said bevel gears; pedal cranks for actuating the bevel gears; a steering rod having a hand steering member rigidly connected therewith, journaled forward in said frame; and a rearwardly disposed rudder vane attached to said steering member.

3. In a water vehicle, the combination of a float structure including two longitudinally parallel pontoons; a frame between said pontoons, attached thereto and depending therefrom, a portion of said frame being inclosed to form a vertical stabilizing plane or fin; a saddle connected with said frame above the pontoons; coöperating bevel gears mounted on said frame; a propeller mounted on the frame, adapted to be driven by said bevel gears; pedal operated cranks for actuating the bevel gears; a steering member mounted forward in said frame between the pontoons; and a rearwardly disposed rudder vane attached to said steering member.

4. In a water vehicle, the combination of a frame of bicycle type construction, which includes a triangular portion having a horizontal member, a saddle and propeller support, a gear case at the lower apex of the triangular portion, and a steering member mounted in the head of the frame; a float structure attached to the horizontal member of the frame and extending longitudinally on both sides of said frame; a covering which incloses the depending triangular portion of the frame, thereby forming a vertical stabilizing fin; coöperating bevel gears mounted in the gear case; a propeller mounted on the frame and adapted to be driven by said gears; and a rudder vane attached to the steering member below the float structure and in forward relation to the stabilizing fin.

5. In a water vehicle, the combination of a frame structure including a triangular portion having a horizontal top member, a gear case at the lower apex of the triangle, a downward extending rear frame member, and a head member; pontoons rigidly attached to the horizontal member of the frame and extending horizontally parallel and equilaterally to said frame; a propeller shaft mounted in bearings on the rear frame member and the triangular member; a propeller carried by said shaft; a bevel pinion on said shaft; a bevel gear mounted in the gear case, in mesh with the pinion on the propeller shaft; pedal cranks for actuating the said bevel gear; a filler member in the triangular portion of the frame; a steering fork mounted in the head of the frame and depending therefrom; means for manually oscillating said steering fork; and a rearwardly disposed rudder vane attached to said fork.

6. In a water vehicle, the combination of a frame structure including a triangular portion having a horizontal top member, a gear case at the lower apex of the triangle, a downward extending rear frame member, and a head member; pontoons rigidly attached to the horizontal member of the frame and extending horizontally parallel and equilaterally to said frame; a propeller shaft mounted in bearings on the rear frame member and the triangular frame member; a propeller carried by said shaft; a bevel pinion on said shaft; a bevel gear mounted in the gear case, in mesh with the pinion on the propeller shaft; pedal cranks for actuating the said bevel gear; a filler member in the triangular portion of the frame; a steering fork mounted in the head of the frame and depending therefrom; means for manually oscillating said steering fork; a rearwardly disposed rudder vane attached to said fork; and a fender for protecting the propeller member.

In testimony whereof I affix my signature.

COROL R. BAKER.

Copies of this patent may be obtained for five cents each, by addressing the "Commissioner of Patents, Washington, D. C."